Feb. 3, 1959 W. A. LAUCK 2,871,733
REAMING TOOL
Filed June 13, 1956

INVENTOR.
WILLIAM A. LAUCK
BY
J. D. Douglas
HIS ATTORNEY

United States Patent Office 2,871,733
Patented Feb. 3, 1959

2,871,733
REAMING TOOL
William A. Lauck, Elyria, Ohio, assignor to Ridge Tool Company, Elyria, Ohio Application June 13, 1956, Serial No. 591,203

10 Claims. (Cl. 77—73)

This invention relates to hand tools adaptable to fabricate pipe or like elements and more particularly to a combination tool wherein means are provided for cutting a predetermined length of pipe and subsequent reaming of said cut pipe or tubing.

Heretofore, the artisan, in fabricating pipe or similar members in the manner disclosed above, has had to be provided with at least two separate tools, namely, a cutting tool and a reaming tool.

By the present invention, the need for separate tools is avoided since the novel construction provided herein enables the artisan to perform the desired operations with only one tool.

Although combined cutting and reaming tools are not new, there have been several disadvantages inherent in the prior art tools which the present invention overcomes. In the prior art tools if a reamer was supplied attached to the tool it was an outwardly projecting device which prevented the user from carrying the same in his pocket. It will be appreciated that these are usually small tools and that conveniently the user may carry them in a pocket. The projecting reamer blade caught on the clothing and frequently tore the pocket or clothing when it was removed.

Furthermore, although cutting with reamers that collapsed were proposed these had several disadvantages. One disadvantage was that they were apt to collapse during use. Another resided in the fact that these had to be small and therefore were not as effective as a larger reamer. Still other disadvantages resided in the fact that they were hard to extend to their useful position.

Other advantages will become more apparent by those versed in the art, and a more thorough understanding thereof will be realized upon reference to the accompanying drawings which form a part of this specification and in which.

Figure 1:
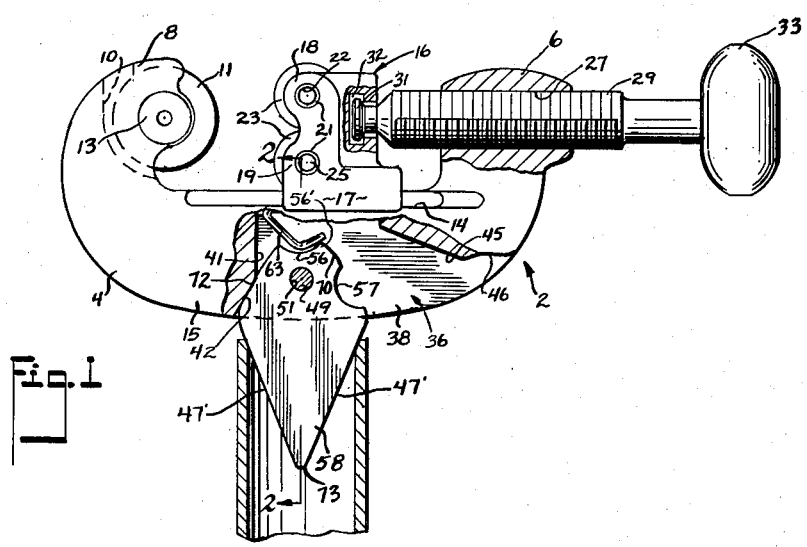
Fig. 1 is an elevational view partly in section, showing one embodiment of the present invention.

Referring now to the drawings throughout which like elements are designated by like reference characters, the numeral 2 denotes the tool of the present invention in its entirety, comprising a generally C-shaped body 4, having an enlarged boss 6 formed on one end, and spaced arms 8, only one being shown, on the opposite end, defining an opening 10 therebetween.

A cutting wheel 11 is disposed within opening 10, and rotatably supported upon a flanged pin 13 extending through opposed apertures (not shown) formed in said arms 8.

A longitudinally extending shelf 14 formed on opposite sides of the shank 15 of the body 4, provides a slidable support for a housing 16, comprising a pair of similarly formed right and left hand upstanding members, the left hand member 17 being shown in Fig. 1; each having spaced abutment portions 18 and 19 formed with circular bosses 21 surrounding opposed and vertically aligned apertures 22.

Rollers 23, are disposed between said upstanding members, and are rotatably supported therein by means of pins 25 inserted into said apertures 22 and in extension therebetween, being also operative to slidably secure said housing upon the shelves 14.

The boss 6 on the body is provided with a threaded aperture 27, and an elongated screw 29 in threaded engagement therewith extends therethrough and toward the spaced arms 8 on the opposite end of the shank 15.

A flat circular head 31 is formed on the end of the screw 29, extending toward said arms 8, and is arranged to be disposed in flanged aperture 32 formed in the housing 16. On the end of screw 29, opposite to said head 31, means are provided to accommodate a lever or handle 33. By rotating the handle 33, rectilinear motion is provided for the housing by means of the interconnected screw 29 threadingly engaged in the aperture 27.

A narrow slot 36 or recess is formed in the shank 15 of the body 4 having a flat base 37, and vertically depending side walls 38. The end wall of said slot, Fig. 3, adjacent to the spaced arms 8, comprises a relatively long vertical portion 41 and obliquely extending short portion 42 continuing from said portion 41, to the edge of the shank.

The opposite end wall comprises a short vertical portion 44, and a longer intermediate portion 45 extending outwardly therefrom. The wall of the housing is relieved at one side as indicated at 46, so that the point of the reaming blade member, more fully hereinafter described, is exposed although it is protected by the opposite wall.

A reaming device comprising a thin metallic blade member 47 having a pointed reaming portion defined by converging edges 47' is rotatably disposed within the slot 36 on a pivot pin 49 which extends through an aperture 51 formed in said blade, and into apertures 53 formed on the side walls 38.

Figure 3:
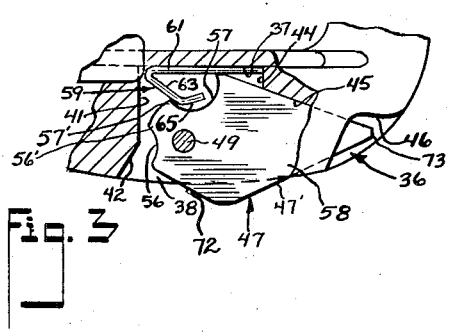
Fig. 3 is a fragmentary view of the combination tool of the present invention illustrating the reamer portion thereof.
Figure 2:
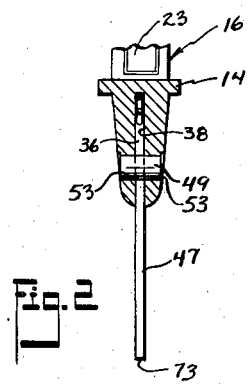
Fig. 2 is a sectional view taken on line 2—2 of Fig. 1.

The base of the blade is formed with a pair of curved seat portions 56 and 57 spaced from the pin 49. A spring member 59 is disposed within the slot 36 and has a base portion 61 seated upon base 37 in the bottom of said slot between the vertical wall portions 41 and 44. It is provided with an outwardly extending arm 63 having a hook-shaped or rounded end 65 arranged to be selectively engaged with one or the other of said seats to provide a resilient locking means for retaining said blade member 47 into its extended or retracted position, as shown in Figs. 1 and 3, respectively.

It should be particularly noted, as viewed in Fig. 1, where the reamer blade is extended that the part of the spring intermediate the ends of the slanting part 65 provides a tangential engagement with the blade at the juncture of the seat 56 and the curved part 70 of the base of the blade. This causes a rotative presure to be applied to the blade, rotating it clockwise, as viewed in the drawings and holding the slanting edge 72 on the base of the blade securely against the seat 42 on the frame. In the closed position, as viewed in Fig. 3, the arm 63 of the spring engages with the high portion 57' which is at the juncture of the curved part 70 and the seat 57, thus causes a rotating pressure counter-clockwise which holds the blade in the pocket.

Although the curved parts 56 and 57 may be considered as seats for engagement by the end of the spring, I find that by properly proportioning the spring to engage with the extremities of the seat rather than the seat itself a highly improved action is obtained.

In cutting a selected length of tubing or pipe, it is placed against rollers 23 on the housing 16 and the screw 29 is threaded into the boss 6 moving said housing and disposed pipe toward and into engagement with the cutting wheel 11. When the pressure exerted by the screw is sufficient to cause the cutting wheel to cut into the pipe a predetermined depth, the tool is then rotated about the pipe whereby the cutting wheel is carried about its periphery and a transverse cut is formed in the wall of said pipe. After one or more rotations of the tool, said transverse cut is complete and the screw is again threaded into the boss 6 moving the pipe toward the cutting wheel, whereby said wheel cuts deeper into the pipe, and thereafter, the tool is rotated to form a deeper transverse cut. This procedure is repeated until the wall of the pipe has been penetrated thereby separating the selected length of pipe from the remaining stock. This operation usually leaves an inwardly projecting burr or fin that must be removed in order that it does not interfere with the flow of liquids through the tubing.

The selected length of tubing is then placed into a vise or similarly operative device with the cut end facing upwardly or outwardly.

By inserting a suitable pry into slot 36 of tool 2 between the blade member 47 and curved wall portion 46, and thereafter applying sufficient force to rotate said blade member about pin 49 against the resistance of spring member 59, said blade member may be removed from its retracted position of Fig. 3, to its extended position of Fig. 1. The hook shaped end 65 of said spring member is forced out of the seat 57, over the portion of blade member between the seats 56 and 57, and into the seat 56 to resiliently retain said blade member in its extended position. It will also be realized that the blade projects far enough beyond the slot or pocket so that it can be turned by grasping with the fingers if desired. The blade member is thereafter inserted into the end of the pipe whereby the edges thereof engage the cut end of the pipe, and through subsequent rotatable manipulation of the tool 2, the sharp edges and burrs caused by the cutting wheel 11 are removed.

It should be particularly noted that in its closed position the locking spring is acting as a resilient source of power operating against a lever which is defined by the radius from the pivot pin to the point of tangential engagement with the spring, and considering the pivot as the fulcrum the other part of the lever is defined by a radius from the fulcrum to the point 73 of the reamer. Thus, although the blade is held in the pocket it is easily moved outward by engaging the point 73 or the adjacent surface with the finger, because the rotative force is exerted in a direction such that the part 57' slides along the spring with a minimum of resistance to the sliding action.

In the open position, however, a different condition exists because the point 56' is engaged by the slanting end of the spring in such a manner that forces exerted which tend to rotate the blade counter-clockwise to a closed position are opposed by the spring which engages the point 56' and the closing pressure is applied to the end 65 of the spring in a direction that is nearly parallel to the part 63 of the spring and substantially normal to the axis of the part 65; therefore the holding power of the end 65 is sufficient to hold the reamer blade open and against the seat 42, and there is less tendency for the blade to close during the reaming operation. The effort to open the blade is therefore considerably less than the effort needed to close the blade.

When it is desired to return the blade member to within the confines of the tool, said member is pivoted upwardly about pin 49 until the hook-shaped end 65 of the spring 59 enters into groove 56 whereby it exerts sufficient pressure to retain said member within the body 6 of the tool, as is shown in Fig. 3.

Having thus described my invention, I am aware that extensive departures may be made therefrom without departing from the scope of the appended claims.

I claim:

1. A reaming tool comprising a C-shaped body formed with a longitudinally extending recess therein which is open at one edge of the body, said recess having a flat bottom wall, a wall normal to the bottom wall at one end and terminating in an oblique wall at the opening into the recess, the other end wall of said recess comprising an oblique wall extending close to the bottom of the recess, a reamer blade having an end pivotally secured in said recess near said normal wall, said blade being formed with inwardly extending seats on the inner end circumferentially spaced about the pivot and the other end of the blade being formed with oblique reaming surfaces, a locking spring comprising an elongated base seated in the flat bottom of said recess and having an obliquely extending arm formed with a seat engaging surface arranged for selective engagement with the seats in said blade to hold it in an extended or retracted position abutting against one or the other of said end walls of the recess.

2. A device as described in claim 1 wherein the short oblique wall provides a seat for engagement by an oblique surface on the reamer blade when the blade is in its extended position to support said blade against accidental closing when a reaming operation is performed.

3. A device as described in claim 1 wherein said long oblique wall of the recess provides a support for the blade when the blade is retracted within the recess, and wherein said body is removed at one side to expose the point of the tool and make it accessible for opening the blade out of the recess.

4. A reaming tool comprising a body having a recess therein which has opposite end walls, a blade pivotally mounted in said recess between said end walls and movable between a retracted position in which it engages one of said end walls and an extended position in which it projects out of said recess and engages the other end wall, and spring means acting between said body and said blade to maintain the blade in engagement with the respective end wall in either of said positions of the blade.

5. A reaming tool comprising a body having a recess therein which is open at one edge of the body, a blade in said recess, means providing a fixed pivotal mounting for the blade on said body, said body presenting end walls at opposite ends of said recess which are interposed in the path of pivotal movement of said blade, and spring means acting between said body and said blade and biasing the blade against one of said end walls when the blade is retracted and biasing the blade against the other of said end walls when the blade is in its extended position projecting out of the said recess.

6. A reaming tool comprising a body having a recess therein which is open at one edge of the body, a thin flat blade having opposite major faces and opposite side edges which interconnect said major faces, a pivot member extending across said recess perpendicular to said major faces of the blade and providing a fixed pivotal support for the blade on the body for pivotal movement of the blade between a retracted position in which the blade is substantially disposed in said recess and an extended position in which the blade projects out of said recess at said one edge of the body, said body presenting transverse end walls at opposite ends of said recess which are disposed in the path of movement of the respective side edges of the blade, and spring means acting between the body and the blade and biasing the blade to position one of its side edges against one of said end walls when the blade is retracted and biasing the blade to position its opposite side edge against the other of said end walls when the blade is extended.

7. The tool of claim 6, wherein the body at said one end wall of the recess presents a cut-away portion at said one edge of the body to expose the outer end of the blade thereat when the blade is in its retracted position.

8. A reaming tool comprising a body having a recess therein which is open at one edge of the body, a thin flat blade having opposite major faces and opposite side edges which interconnect said major faces, a pivot member extending across said recess perpendicular to said major faces of the blade and providing a fixed pivotal support for the blade on the body for pivotal movement of the blade between a retracted position in which the blade is substantially disposed in said recess and an extended position in which the blade projects out of said recess at said one edge of the body, said body presenting transverse end walls at opposite ends of said recess which are disposed in the path of movement of the respective side edges of the blade, and spring means acting between the body and the blade and biasing the blade to position one of its side edges against one of said end walls when the blade is retracted and biasing the blade to position its opposite side edge against the other of said end walls when the blade is extended, said spring means comprising a spring having a base portion seated against an inner wall of said recess remote from said one edge of the body and an outwardly extending portion which projects from said base portion toward said one edge of the body, said pivot member being positioned between said outwardly extending portion of the spring and said one edge of the body, said blade at its inner edge presenting cut-away seat portions at opposite sides of said pivot member and an oppositely curved edge which joins said seat portions, said outwardly extending portion of the spring engaging the edge of the blade at the seat portion which is closest to said one end wall of the recess when said blade is in its retracted position engaging said one end wall of the recess, and said outwardly extending portion of the spring engaging the other seat portion when said blade is in its extended position engaging the opposite end wall of the recess.

9. The tool of claim 8 wherein said outwardly extending portion of the spring engages the inner edge of the blade tangentially at the respective junctures between said oppositely curved portion and said seat portions in the respective retracted and extended positions of the blade to maintain the blade against the respective end walls of the recess.

10. The tool of claim 8, wherein the body at said one end wall of the recess presents a cut-away portion at said one edge of the body to expose the outer end of the blade thereat when the blade is in its retracted position.

References Cited in the file of this patent

UNITED STATES PATENTS

| 1,056,081 | Yerzley | Mar. 18, 1913 |
| 2,629,926 | Franck | Mar. 3, 1953 |
| 2,630,028 | McIntosh | Mar. 3, 1953 |

FOREIGN PATENTS

| 310,291 | Switzerland | Dec. 16, 1955 |